United States Patent [19]
Saito

[11] Patent Number: 5,982,192
[45] Date of Patent: Nov. 9, 1999

[54] HIGH SPEED BUS CIRCUIT SYSTEM

[75] Inventor: Seiichi Saito, Tokyo, Japan

[73] Assignee: Mitsubishi Denki Kabushiki Kaisha, Tokyo, Japan

[21] Appl. No.: 09/015,942

[22] Filed: Jan. 30, 1998

[30] Foreign Application Priority Data

Jul. 25, 1997 [JP] Japan ..................... 9-199545

[51] Int. Cl.⁶ ............... H03K 17/16; H03K 19/0175; H01K 3/08
[52] U.S. Cl. .............. 326/30; 326/30; 326/21; 326/86; 326/90; 326/82; 333/100; 333/124; 333/128
[58] Field of Search ................ 326/30, 21, 86, 326/90, 82; 333/100, 124, 128, 136, 127

[56] References Cited

U.S. PATENT DOCUMENTS

| | | |
|---|---|---|
| 5,347,177 | 9/1994 | Lipp ......................................... 326/30 |
| 5,528,168 | 6/1996 | Kleveland .................................. 326/30 |
| 5,668,834 | 9/1997 | Takekuma et al. ...................... 375/257 |
| 5,757,249 | 5/1998 | Gabara et al. ........................... 333/101 |
| 5,850,154 | 12/1998 | Higuchi ..................................... 326/86 |

Primary Examiner—Michael Tokar
Assistant Examiner—James H. Cho

[57] ABSTRACT

A high speed bus circuit system according to the present invention includes a bus having alternately connected resistors and transmission lines, and integrated circuits. Each of the resistors has a predetermined resistance value. The transmission lines are mounted on print circuit boards. The bus is connected in a loop form as a whole. Each of the integrated circuits has a driver and a receiver. The driver and receiver are connected to respective one of the resistors. As a result, DC power dissipation in the terminal resistor of the bus circuit is suppressed. In addition, high speed signal transfer causing less waveform distortion is made possible.

10 Claims, 7 Drawing Sheets

HIGH SPEED BUS CIRCUIT SYSTEM

BACKGROUND OF THE INVENTION

1. Field of the Invention

The present invention relates to a high speed bus circuit system for transferring data with low power dissipation and at high speed in digital devices such as computers.

2. Description of the Related Art

In digital devices such as computers, it is necessary to connect interconnect data lines of various integrated circuits (hereafter referred to as ICs) including a processor with a bus and exchange data. However, the signal rate on the bus is finite. In high speed data transfer, therefore, signal propagation time cannot be disregarded. If there is a mismatching place of transfer impedance on the bus, waveform distortion caused by reflection makes high speed data transfer difficult. Thus a high speed bus reduced as far as possible in transfer impedance is needed.

FIG. 11 is a diagram showing the configuration of a conventional high speed bus circuit system described in, for example, "Comparison of small amplitude interfaces of bus systems headed for 100 MHz age, "Nikkei Electronics, No. 93. 9. 27.

In conventional high speed bus circuit systems, a scheme in which terminal resistors are pulled up to power supplies on both ends of a bus as shown in FIG. 11 is often used. In such a scheme, the terminal resistors function to reduce the reflection distortion, and consequently high speed data transfer can be conducted.

In FIG. 11, characters IC1 through IC5 denote integrated circuits each incorporating a driver (D) and a receiver (R). Characters SL1 through SL4 denote transmission lines mounted on print circuit boards to transfer signals. Characters Ra and Rb denote terminal resistors connected to ends of the bus. Remaining ends of the resistors Ra and Rb are connected to the power supplies.

Operation will now be described by referring to FIGS. 11 and 12. FIG. 12 is a diagram illustrating the operation of the conventional high speed circuit system.

In FIG. 11, data transfer operation via the high speed bus is conducted in such a manner that one of the IC1 through IC5 connected to the bus drives the bus and a signal appearing on the bus is received by other ICs. For example, in the case where the IC3 drives the bus and transmits data, the IC1, IC2, IC4 and IC5 receive that data.

For example, it is now assumed that the IC3 drives the bus. First of all, portions of the transmission lines SL2 and SL3 located in the vicinity of the IC3 are simultaneously driven. In the leftward direction, the signal is transferred from the transmission line SL2 to the SL1, then to the terminal resistor Ra as represented by a broken line in FIG. 11. In the rightward direction, the signal is transferred from the transmission line SL3 to the SL4, then to the terminal resistor Rb.

The terminal resistors Ra and Rb function to absorb the mismatching of transfer impedance caused in the IC1 and IC5 portions. When the terminal resistance value has coincided with the impedance of the transmission line, the most significant effect is obtained.

Assuming now that the terminal resistors Ra and Rb are not present and the configuration excepting the Ra and Rb is the same as that of FIG. 11, FIG. 12 is a schematic diagram showing how the signal propagates with arrows together with schematic waveforms at respective time points. In FIG. 12, the ordinate indicates the time and the abscissa indicates the position.

In the case where the terminal resistors Ra and Rb are not present, the transfer impedance in the signal transfer direction becomes infinitely great (i.e., the transmiss ion line becomes open). In these positions, therefore, significant reflection is caused and reflected components are returned on the bus while following the routes indicated by arrows on broken lines. As shown in FIG. 12, large reflection is caused in each of the positions of the IC1 and IC5, and reflected components are transferred to respective ICs and appear as waveform distortions. if such waveform distortion is large, data errors are caused by the distortion and consequently the high speed data transfer cannot be conducted.

On the other hand, in the case where the terminal resistors Ra and Rb are connected in the positions of the IC1 and IC5, respectively, resistance values of the terminal resistors become the transfer impedance values in the signal transfer direct ion and the reflected components (i.e. , the components indicated by the broken line arrows in FIG. 12) are suppressed. This reflected component becomes "0" when the transmission ling coincides with the terminal resistance value. By connecting terminal resistors, therefore, the waveform distortion is improved and high speed transfer becomes possible.

In the foregoing description, it is supposed that input impedance values of the IC1, IC2, IC3, IC4 and IC5 functioning as the receivers R are sufficiently high and exert little influence on the signal transfer and consequently the waveform distortion caused by them can be disregarded.

Since the conventional high speed bus circuit system is configured as heretofore described, high speed signals can be transferred. However, the conventional high speed bus circuit system has problems of a temperature rise and quickened battery exhaustion caused by great useless DC (direct current) power dissipation in the terminal resistors located at both ends of the bus.

For example, assuming that each of the terminal resistors Ra and Rb has a resistance value of 50 ohms ($\Omega$), the power supply voltage is 5 V, and the data is "L", the useless DC power dissipation W per signal line of the bus becomes $W=2\times5^2/50=1$ watt.

If the bus is formed by 64 signal lines, the useless DC power dissipation $W_{64}$ amounts to $W_{64}=1\times64=64$ watts.

SUMMARY OF THE INVENTION

The present invention has been made in order to eliminate the above described problems. An object of the present invention is to provide a high speed bus circuit system making possible high speed signal transfer which suppresses the DC power dissipation in the terminal resistors and causes less waveform distortion.

A high speed bus circuit system according to the present invention includes: a bus including alternately connected resistors and transmission lines, each of the resistors having a predetermined resistance value, the transmission lines being mounted on print circuit boards, the bus being connected in a loop form as a whole; and integrated circuits each having a driver and a receiver, the driver and the receiver being connected to respective one of the resistors.

In a high speed bus circuit system according to the present invention, respective one of the integrated circuits is connected to only one end of each of the resistors so that corresponding one of the resistors may act as a terminal resistor and a sending-end resistor when one of the drivers drives the bus.

In a high speed bus circuit system according to the present invention, respective one of the integrated circuits is connected to only one end of each of the resistors.

In a high speed bus circuit system according to the present invention, a plurality of ones out of the integrated circuits are connected to only one end of each of the resistors.

In a high speed bus circuit system according to the present invention, respective one(s) of the integrated circuits is (are) connected to each end of each of the resistors so that corresponding one of the resistors may act as a terminal resistor and a sending-end resistor when one of the drivers drives the bus.

In a high speed bus circuit system according to the present invention, respective one of the integrated circuits is connected to each end of each of the resistors.

In a high speed bus circuit system according to the present invention, a plurality of ones out of said integrated circuits are connected to each end of each of the resistors.

A high speed bus circuit system according to the present invention includes: a first bus and a second bus each including alternately connected resistors and transmission lines, each of the resistors having a predetermined resistance value, the transmission lines being mounted on print circuit boards, each of the first bus and the second bus being connected in a loop form as a whole; and integrated circuits each having a differential driver and a differential receiver, a plus side of the driver and the receiver being connected to respective one resistor of the first bus, a minus side of the driver and the receiver being connected to respective one resistor of the second bus.

A high speed bus circuit system according to the present invention includes: a bus including alternately connected resistors and transmission lines, each of the resistors having a predetermined resistance value, the transmission lines being mounted on print circuit boards, the bus being connected in a loop form as a whole; and integrated circuits each having a driver and a receiver disconnected from each other, the driver and the receiver being respectively connected to one end and the other end of respective one of the resistors.

A high speed bus circuit system according to the present invention further includes an abnormality detector for outputting data to a driver of a specific integrated circuit, receiving data from a receiver of the specific integrated circuit, comparing the outputted data with the received data, and thereby detecting an abnormality of the bus.

DESCRIPTION OF THE PREFERRED EMBODIMENTS

First Embodiment

Hereafter, a first embodiment of the present invention will be described by referring to FIGS. 1 through 4.

Figure 1:
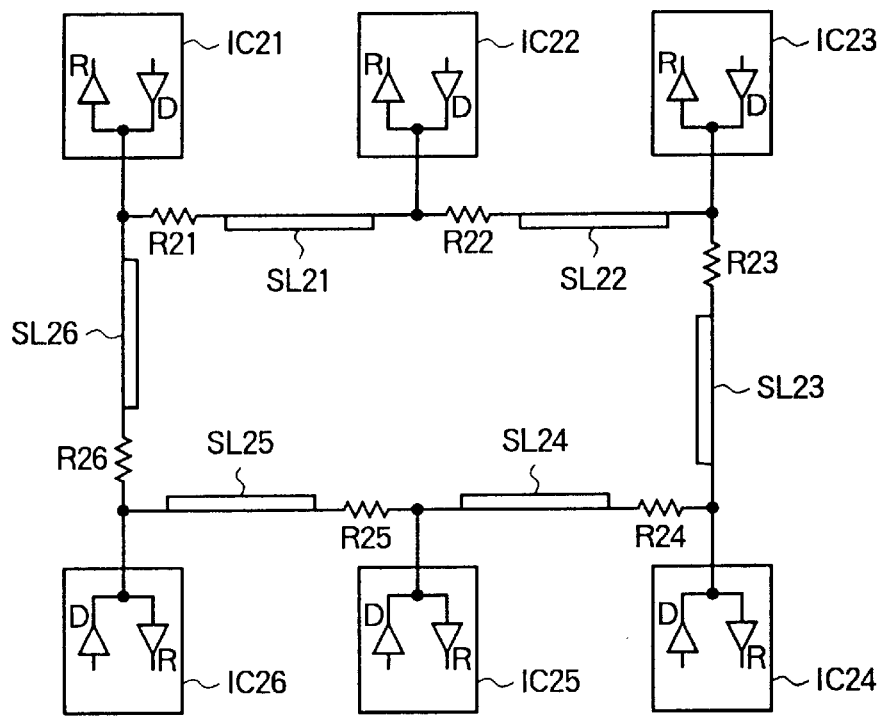
FIG. 1 is a diagram showing a basic circuit of a first embodiment of a high speed circuit system according to the present invention.

FIG. 1 shows a basic circuit diagram of the present embodiment. In FIG. 1, IC21 through IC26 denote ICs (integrated circuits) each incorporating a driver (D) and a receiver (R). SL21 through SL26 denote transmission lines mounted on print circuit boards to transfer signals on a bus. R21 through R26 denote resistors.

Figure 11:
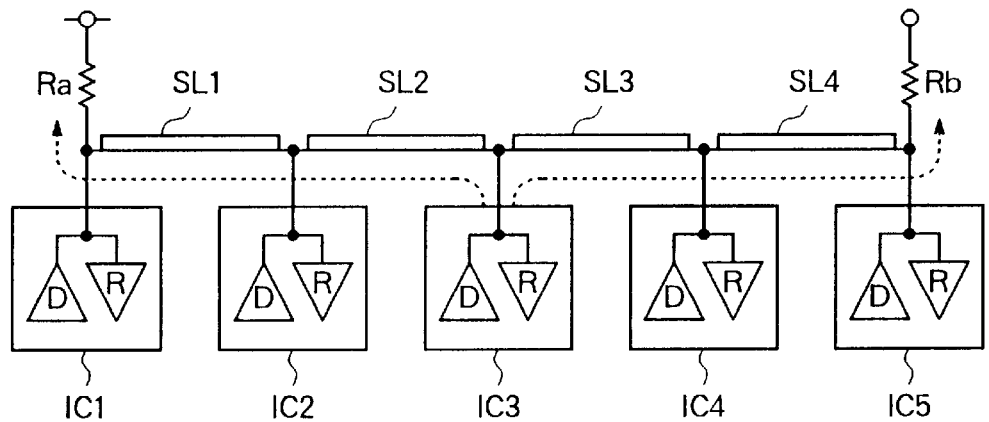
FIG. 11 is a diagram showing a basic circuit of a conventional high speed bus circuit system.
Figure 12:
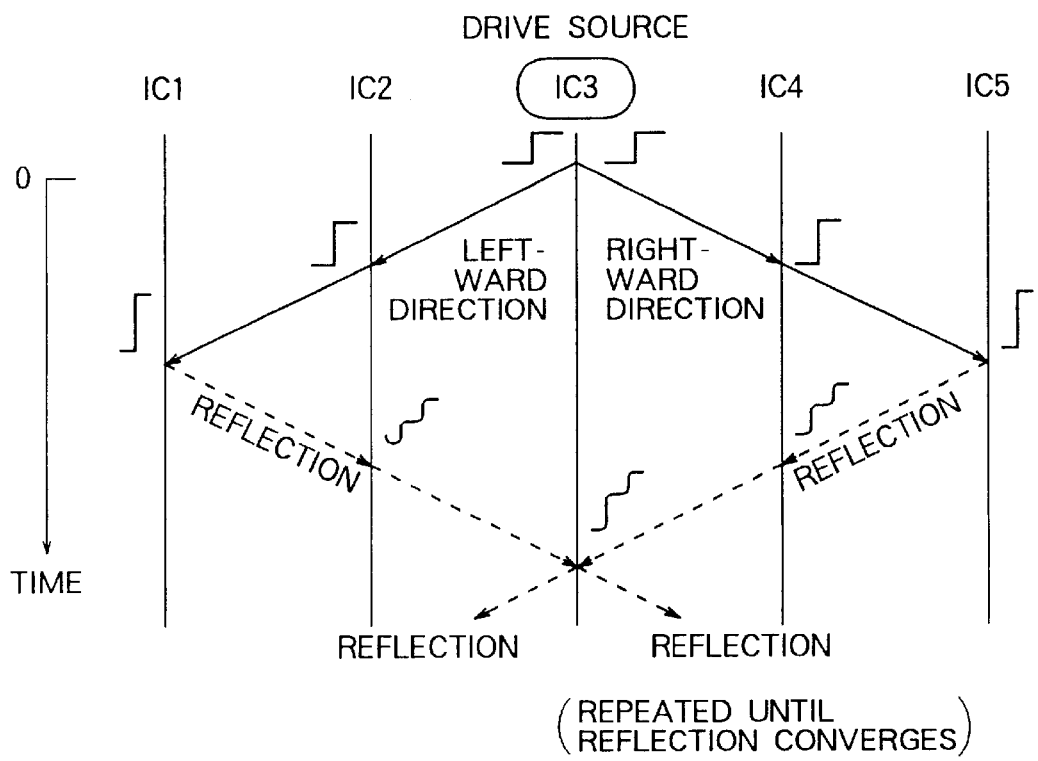
FIG. 12 is a diagram illustrating the operation of the basic circuit of the conventional high speed bus circuit system.

Operation will now be described. In data transfer via the bus, one of the ICs 21 through 26 connected to the bus drives the bus and a signal then appearing on the bus is received by other ICs in the same way as the operation of the conventional scheme shown in FIG. 11.

In the ensuing description of all embodiments according to the present invention, it is supposed that input impedance values of the receivers R are sufficiently high and exert little influence on the signal transfer and consequently the waveform distortion caused by them can be disregarded in the same way as the description of the conventional scheme.

In accordance with features of the present embodiment shown in FIG. 1, the bus is formed in a loop form, a resistor is inserted between transmission lines connecting ICs, and one side of each resistor is directly connected to its corresponding driver D and receiver R without intervention of a transmission line.

Figure 2:
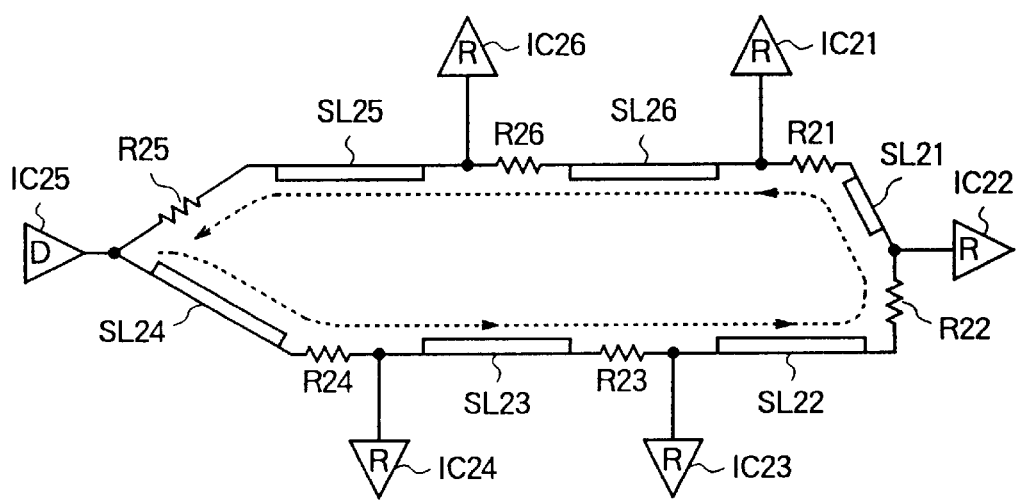
FIG. 2 is a diagram illustrating the operation of the first embodiment of a high speed circuit system according to the present invention.

Assuming now that, for example, the IC25 drives the bus and sends a signal, the circuit can be equivalently rewritten as shown in FIG. 2.

At the moment when the driver D of the IC25 has driven the bus shown in FIG. 2, the left end of the transmission line SL24 located nearest the output and the right end of the transmission line SL25 connected to the output via the resistor R25 become the load. And a counterclockwise signal transfer route starting from the left end of the transmission line SL24 is formed as indicated by broken line arrows. In a direction opposite to that indicated by broken line arrows, a clockwise signal transfer route starting from the resistor R25 is formed.

Figure 3:
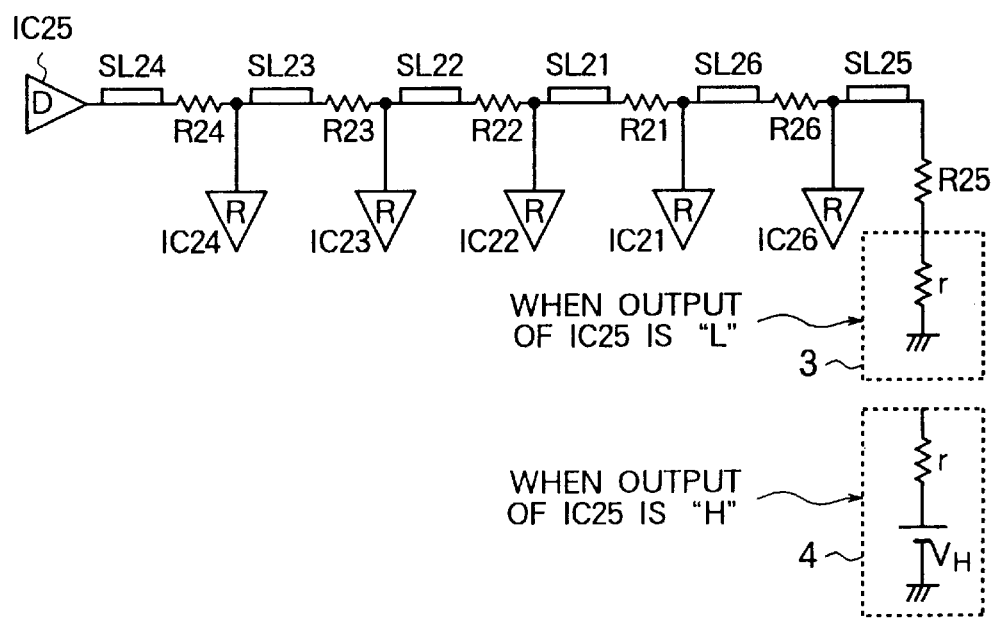
FIG. 3 is a diagram showing the equivalent circuit of the basic circuit of the first embodiment of a high speed circuit system according to the present invention.

The counterclockwise signal transfer route shown in FIG. 2 can be further rewritten as shown in an equivalent circuit of FIG. 3.

With reference to FIG. 3, the driver D of the IC25 first drives the left end of the transmission line SL24. A signal transferred through the SL24 arrives at the transmission line SL23 via the resistor R24. The signal is transferred via the resistor R23, the transmission line SL22, the resistor R22, the transmission line SL21, the resistor R21, the transmission line SL26, the resistor R26, the transmission line SL25, and the resistor R25 in the cited order.

To the opposite side of the resistor R25 from the transmission line SL25, the output of the signal source IC25 shown in FIG. 2 is connected. In FIG. 3, the case where the output of the IC25 is "L" is equivalently represented by a circuit 3, and the case where the output of the IC25 is "H" is equivalently represented by a circuit 4.

In other words, in the case where the output of the IC25 is "L", it can be considered that the terminal resistance R25 is connected to the ground via small impedance r. When the output of the IC25 is "H", it can be considered that the terminal resistor R25 is connected to a voltage level VH obtained when the output of the IC25 is "H".

Thus the resistor R25 is terminated by the same voltage level as the output of the signal source IC25 has. As a result, a useless dissipated current does not flow. If output impedance r of the IC25 is made sufficiently small, the resistor R25 functions as the terminal resistor and the reflection can be suppressed. In other words, the output of the IC25 can be regarded as the same potential as the ground and the power supply when seen from the AC viewpoint. Thus the resistor R25 functions as the terminal resistor, and occurrence of the reflection component can be suppressed.

Figure 4:
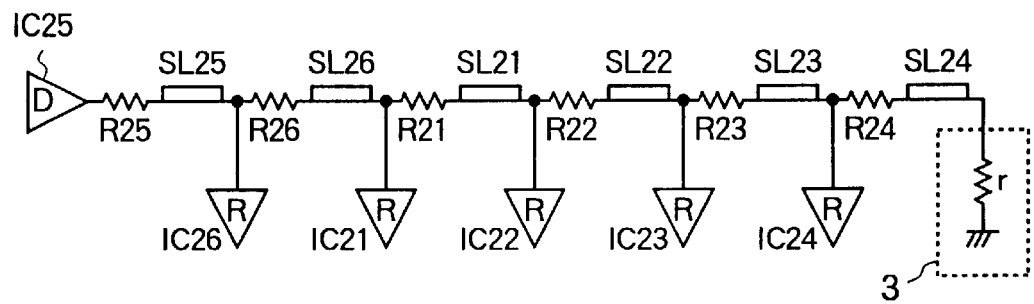
FIG. 4 is a diagram showing the equivalent circuit of the basic circuit of the first embodiment of a high speed circuit system according to the present invention.

On the other hand, the clockwise signal transfer route in the direction opposite to the direction of the broken line arrows shown in FIG. 2 can be further rewritten as an equivalent circuit. A circuit shown in FIG. 4 is thus obtained. As apparent from FIG. 4, the resistor R25 connected to the output of the driver D of the IC25 acts as a sending-end impedance in driving the transmission line SL25 and functions to reduce the reflection.

Since all of the resistors R21 through R26 included in this high speed bus have the same DC voltage levels, useless dissipated currents do not flow.

It was experimentally confirmed that the optimum resistance value of each of the resistors R21 through R26 was approximately 20 ohms (Ω).

In the configuration of each of embodiments including embodiments described later, the optimum value of the resistors depends upon the number of resistors with exerting little influence upon the number of the receivers R. If the number of the resistors is two, the optimum value is approximately 50 ohms (Ω). If the number of the resistors is four, the optimum value is approximately 30 ohms (Ω). If the number of the resistors is six, the optimum value is approximately 20 ohms (Ω). By thus decreasing the resistance value as the number of the resistors increases, the waveform distortion can be suppressed and suitable amplitude can be obtained.

Second Embodiment

A second embodiment of the present invention will now be described by referring to FIG. 5.

Figure 5:
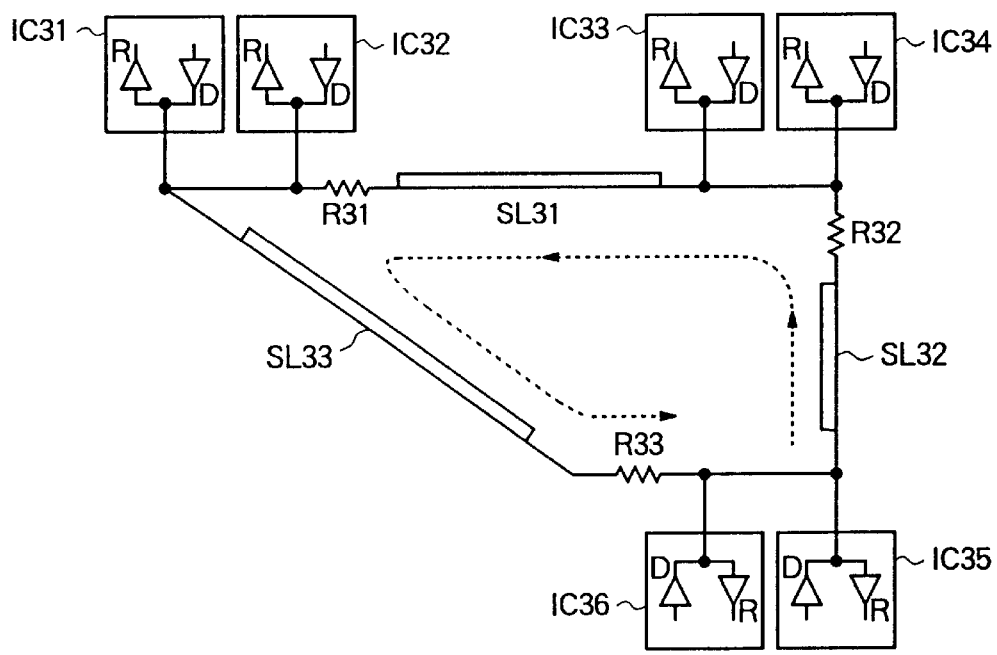
FIG. 5 is a diagram showing a basic circuit of a second embodiment of a high speed circuit system according to the present invention.

FIG. 5 shows a basic circuit diagram of the present embodiment. In FIG. 5, IC31 through IC36 denote ICs each incorporating a driver (D) and a receiver (R). SL31 through SL33 denote transmission lines mounted on print circuit boards to transfer signals on a bus. R31 through R36 denote resistors.

The configuration of the present embodiment is the same as that of the above described first embodiment in that the bus is formed in a loop form and a resistor is inserted in series between transmission lines connecting ICs. However, the configuration of the present embodiment is different from that of the first embodiment in that two or more ICs are connected to one place when connecting a plurality of ICs via resistors.

Operation will now be described. The operation of driving the bus and sending a signal is the same as that of the first embodiment. One of the IC31 through IC36 connected to the bus drives the bus, and a signal is transferred via a counterclockwise transfer route and a clockwise transfer route.

It is now assumed as an example that the driver D of the IC35 drives the bus. At the moment when the driver D of the IC35 has driven the bus, the IC36, the transmission line SL32, and the transmission line SL33 connected via the resistor R33 become Loads with respect to the output of the IC35.

The counterclockwise signal transfer route and the clockwise signal transfer route can be rewritten as equivalent circuits in the same way as FIG. 3 and FIG. 4 of the first embodiment. Since they can be inferred easily, however, they are omitted in the present embodiment and description will be given by referring to only FIG. 5.

As represented by broken line arrows in FIG. 5, the bottom end of the transmission line SL32 is first driven. A signal transferred through the SL32 arrives at the transmission Line SL31 via the resistor R32. Furthermore, the signal is transferred through the resistor R31, the transmission line SL33, and the resistor R33 in the cited order.

The opposite side of the resistor R33 from the transmission line SL33 is connected to the output of the signal source IC35 and consequently has the same DC level as the signal which has arrived as a result of the transfer. Therefore, a useless dissipated current does not flow. From the AC viewpoint, the resistor R33 acts as the terminal resistor if the output impedance of the IC35 is made sufficiently small. Thus the reflection can be suppressed.

On the other hand, in the clockwise signal transfer route having a direction opposite to the direction of the broken line arrows of FIG. 5, the resistor R33 connected to the output of the driver D of the IC35 acts as a sending-end impedance in driving the transmission line SL33 and functions to reduce the reflection. Since all of the resistors R31 through R33 included in this high speed bus shown in FIG. 5 have the same DC voltage levels, useless dissipated currents do not flow.

Third Embodiment

A third embodiment of the present invention will now be described by referring to FIG. 6.

Figure 6:
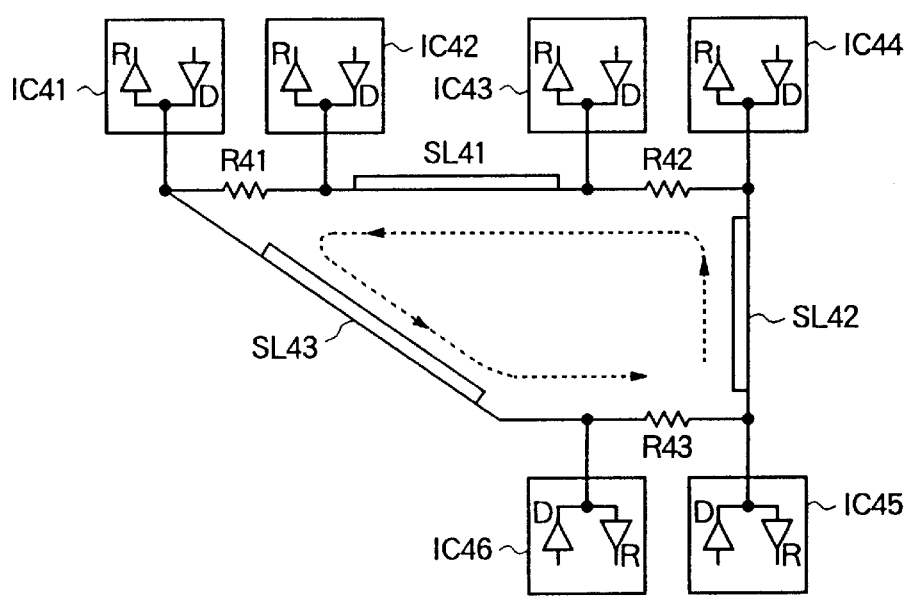
FIG. 6 is a diagram showing a basic circuit of a third embodiment of a) high speed circuit system according to the present invention.

FIG. 6 shows a basic circuit diagram of the present embodiment. In FIG. 6, IC41 through IC46 denote ICs each incorporating a driver D and a receiver R. SL41 through SL43 denote transmission lines mounted on print circuit boards to transfer signals on a bus. R41 through R43 denote resistors.

The configuration of the present embodiment is the same as that of the above described first and second embodiments in that the bus is formed in a loop form and a resistor is inserted in series between transmission lines connecting ICs. However, the configuration of the present embodiment is different from that of the first and second embodiments in that an IC is directly connected to the other side of each resistor as well.

Operation will now be described. The operation of driving the bus and sending a signal is the same as that of the first and second embodiments. One of the IC41 through IC46 connected to the bus drives the bus, and a signal is transferred via a counterclockwise transfer route and a clockwise transfer route.

It is now assumed as an example that the driver D of the IC45 drives the bus. At the moment when the driver D of the IC45 has driven the bus, the bottom side of the transmission line SL42, and the IC46 and the right side of the transmission line SL43 connected via the resistor R43 become loads with respect to the output of the IC45.

The counterclockwise signal transfer route and the clockwise signal transfer route can be rewritten as equivalent circuits in the same way as FIG. 3 and FIG. 4 of the first embodiment. Since they can be inferred easily, however, they are omitted in the present embodiment and description will be given by referring to only FIG. 6.

In the counterclockwise signal transfer route, the bottom end of the transmission line SL42 is first driven as represented by broken line arrows in FIG. 6. A signal transferred through the SL42 arrives at the transmission line SL41 via the resistor R42. Furthermore, the signal is transferred through the resistor R41, the transmission line SL43, and the resistor R43 in the cited order.

The other side of the resistor R43 is connected to the output of the signal source IC45 and consequently has the same DC level as the signal which has arrived as a result of the transfer. Therefore, a useless dissipated current does not flow. From the AC viewpoint, the resistor R43 acts as the terminal resistor if the output impedance of the IC45 is made sufficiently small. Thus the reflection can be suppressed.

On the other hand, in the clockwise signal transfer route having a direction opposite to that of the broken line arrows of FIG. 6, the resistor R43 connected to the output of the driver D of the IC45 acts as a sending-end resistor in driving the transmission line SL43 and functions to reduce the reflection.

Since all of the resistors R41 through R43 included in this high speed bus shown in FIG. 6 have the same DC voltage levels, useless dissipated currents do not flow.

Fourth Embodiment

A fourth embodiment of the present invention will now be described by referring to FIG. 7.

Figure 7:
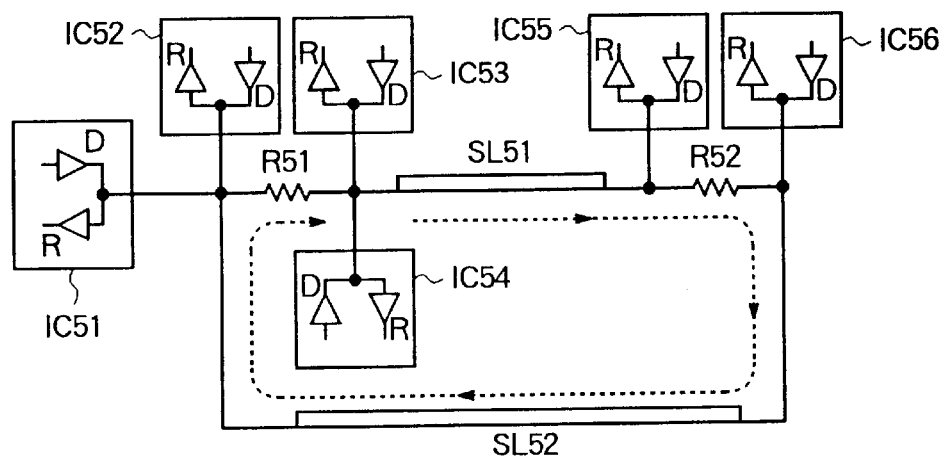
FIG. 7 is a diagram showing a basic circuit of a fourth embodiment of a high speed circuit system according to the present invention.

FIG. 7 shows a basic circuit diagram of the present embodiment. In FIG. 7, IC51 through IC56 denote ICs each incorporating a driver D and a receiver R. SL51 through SL52 denote transmission lines mounted on print circuit boards to transfer signals on a bus. R51 and R52 denote resistors.

The configuration of the present embodiment is the same as that of the above described first through third embodiments in that the bus is formed in a loop form and a resistor is inserted in series between transmission lines connecting ICs. However, the configuration of the present embodiment is different from that of the first through third embodiments in that two or more ICs are connected to one end of each resistor and two or more ICs are connected to the other side of each resistor as well.

Operation will now be described. The operation of driving the bus and sending a signal is the same as that of the first through third embodiments. One of the IC51 through IC56 connected to the bus drives the bus, and a signal is transferred via a counterclockwise transfer route and a clockwise transfer route.

The counterclockwise signal transfer route and the clockwise signal transfer route can be rewritten as equivalent circuits in the same way as FIG. 3 and FIG. 4 of the first embodiment. Since they can be inferred easily, however, they are omitted in the present embodiment and description will be given by referring to only FIG. 7.

It is now assumed as an example that the driver D of the IC54 drives the bus. At the moment when the driver D of the IC54 has driven the bus, the IC53 and the left end of the transmission line SL51 directly connected to the driver D of the IC54, and the IC51, IC52, and the left end of the transmission line SL52 connected via the resistor R51 become loads with respect to the output of the IC54.

First of all in the clockwise signal transfer route, the driver D of the IC54 drives the left end of the transmission line SL51 as represented by broken line arrows in FIG. 7. A signal transferred through the SL51 arrives at the transmission line SL52 and then resistor R51 via the resistor R52. The other side of the resistor R51 is connected to the output of the signal source IC54 and consequently has the same DC level as the signal which has arrived as a result of the transfer. Therefore, a useless dissipated current does not flow. From the AC viewpoint, the resistor R51 acts as the terminal resistor if the output impedance of the IC54 is made sufficiently small. Thus the reflection can be suppressed.

On the other hand, in the counterclockwise signal transfer route having a direction opposite to that of the broken line arrows of FIG. 7, the resistor R51 connected to the output of the driver D of the IC54 acts as a sending-end resistor in driving the transmission line SL52 and functions to reduce the reflection.

Since both the resistor R51 and R52 included in this high speed bus shown in FIG. 7 have the same DC voltage levels, useless dissipated currents do not flow.

Fifth Embodiment

A fifth embodiment of the present invention will now be described by referring to FIG. 8.

Figure 8:
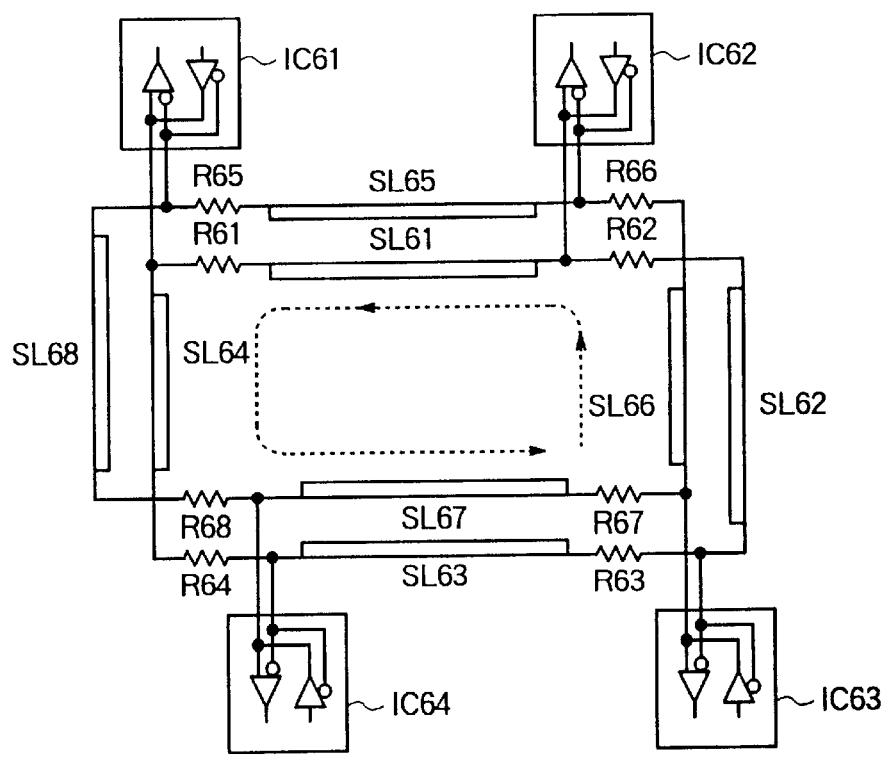
FIG. 8 is a diagram showing a basic circuit of a fifth embodiment of a high speed circuit system according to the present invention.

FIG. 8 shows a basic circuit diagram of the present embodiment. In FIG. 8, IC61 through IC64 denote ICs each incorporating a differential driver D and a differential receiver R. SL61 through SL68 denote transmission lines mounted on print circuit boards to transfer signals on a bus. R61 through R68 denote resistors.

The configuration of the present embodiment is the same as that of the above described first through fourth embodiments in that the bus is formed in a loop form and a resistor is inserted in series between transmission lines connecting ICs. However, the configuration of the present embodiment is different from that of the first through fourth embodiments in that a (+) side and (−) side of each IC are directly connected to respective resistors as a two-system loop-formed bus corresponding to the differential drivers and receivers.

Operation will now be described. In the present embodiment, the (+) side output of a differential driver drives one of the two systems of the bus, and the (−) side output drives the other of the two systems of the bus. If attention is paid to each system of the bus, the operation of driving the bus and sending a signal is the same as that of the first embodiment.

One of the IC61 through IC64 connected to the bus drives the bus, and a signal is transferred via a counterclockwise transfer route and a clockwise transfer route. In each differential driver, the (+) side output is set equal to "H" and the (−) side output is set equal to "L" when outputting data of "H". On the contrary, the (+) side output is set equal to "L" and the (−) side output is set equal to "H" when outputting data of "L". Each differential receiver detects the difference between the (+) side signal and the (−) side signal on the bus, and receives signals having a positive difference as "H" and signals having a negative difference as "L".

It is now assumed as an example that the driver of the IC63 drives the bus. At the moment when the driver of the IC63 has driven the bus, the transmission line SL62 and the transmission line SL63 connected via the resistor R63 becomes loads with respect to the (+) side output of the IC63, and the transmission line SL66 and the transmission line SL67 connected via the resistor R67 becomes loads with respect to the (−) side output of the IC63.

In the counterclockwise signal transfer route, the driver of the IC63 first drives bottom ends of the transmission lines SL62 and SL66 as represented by broken line arrows in FIG. 8. A signal transferred through the SL62 and SL66 arrives at the transmission lines SL61 and SL65 via the resistors R62 and R66. Furthermore, the signals is transferred through the resistors R61 and R65, the transmission lines SL64 and SL68, the transmission lines SL63 and SL67, and the resistors R63 and R67 in the cited order.

The other sides of the resistors R63 and R67 are respectively connected to a (+) side output and a (−) side output of the signal source IC63 and consequently have the same DC levels as the signal which has arrived as a result of the transfer. Therefore, a useless dissipated current does not flow. From the AC viewpoint, the resistors R63 and R67 act as the terminal resistors if the output impedance of the IC63 is made sufficiently small. Thus the reflection can be suppressed.

On the other hand, in the clockwise signal transfer route having a direction opposite to that of the broken line arrows of FIG. 8, the resistor R63 connected to the (+) side output of the driver of the IC63 and the resistor P67 connected to the (−) side output of the driver of the IC63 act as sending-end resistors in driving the transmission lines SL63 and SL67 and function to reduce the reflection.

Since the voltages across the resistors R61 through R68 included in this high speed bus shown in FIG. 8 have the same DC voltage levels, useless dissipated currents do not flow.

Sixth Embodiment

A sixth embodiment of the present invention will now be described by referring to FIG. 9.

Figure 9:
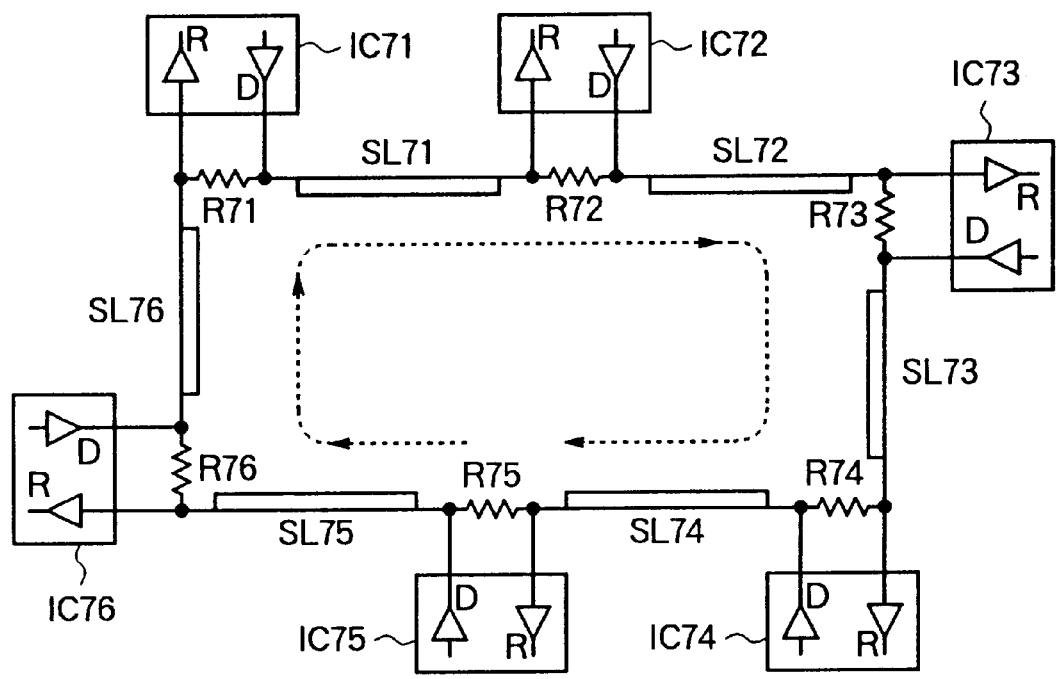
FIG. 9 is a diagram showing a basic circuit of a sixth embodiment of a high speed circuit system according to the present invention.

FIG. 9 shows a basic circuit diagram of the present embodiment. In FIG. 9, IC71 through IC76 denote ICs each incorporating a driver D and a receiver R. SL71 through SL76 denote transmission lines mounted on print circuit boards to transfer signals on a bus. R71 and R76 denote resistors.

The configuration of the present embodiment is the same as that of the above described first through fifth embodiments in that the bus is formed in a loop form and a resistor is inserted in series between transmission lines connecting ICs. However, the configuration of the present embodiment is different from that of the first through fifth embodiments in that connection among the driver D, the receiver R, and the bus in each IC is uncoupled and a resistor is inserted between the driver D and the receiver R.

Operation will now be described. The operation of driving the bus and sending a signal is the same as that of the first embodiment. One of the IC71 through IC76 connected to the bus drives the bus, and a signal is transferred via a counterclockwise transfer route and a clockwise transfer route.

It is now assumed as an example that the driver D of the IC75 drives the bus. At the moment when the driver D of the IC75 has driven the bus, the transmission line SL75, and the transmission line SL74 connected via the resistor R75 become loads with respect to the output of the IC75.

In the clockwise signal transfer route, the right end of the transmission line SL75 is first driven as represented by broker line arrows in FIG. 9. A signal transferred through the SL75 arrives at the transmission line SL76 via the resistor R76. Furthermore, the signal is transferred through the resistor R71, the transmission line SL71, the resistor R72, the transmission line SL72, the resistor R73, the transmission line SL73, the resistor R74, the transmission line SL74, and the resistor R75 in the cited order.

The other side of the resistor R75 is connected to the output of the signal source IC75 and consequently has the same DC level as the signal which has arrived as a result of the transfer. Therefore, a useless dissipated current does not flow. From the AC viewpoint, the resistor R75 acts as the terminal resistor if the output impedance of the IC75 is made sufficiently small. Thus the reflection can be suppressed.

On the other hand, in the counterclockwise signal transfer route having a direction opposite to the direction of the broken line arrows of FIG. 9, the resistor R75 connected to the output of the driver D of the IC75 acts as a sending-end resistor in driving the transmission line SL74 and functions to reduce the reflection.

The signal transfer in the present embodiment is conducted as heretofore described. Since all of the resistors R71 through R76 included in the high speed bus shown in FIG. 9 have the same DC voltage levels, useless power dissipation does not occur.

In the configuration of FIG. 9, the driver of each IC is disconnected from the receiver thereof and a resistor is inserted between the driver and receiver. The receiver R receives a signal located at an opposite end of the bus from the end of the bus driven by the driver. By the resistor between the driver D and the receiver R, a part of a signal from the driver D is directly applied to the receiver R. If an input threshold of the receiver R is set lower than the signal transferred through the resistor, however, the signal can be adapted to be recognized only when the signal transferred through the entire loop-formed bus has arrived at the receiver R.

In other words, it is possible in the present embodiment to monitor with the receiver R how the high speed bus is connected normally and data are transferred.

Seventh Embodiment

A seventh embodiment of the present invention will now be described by referring to FIG. 10.

Figure 10:
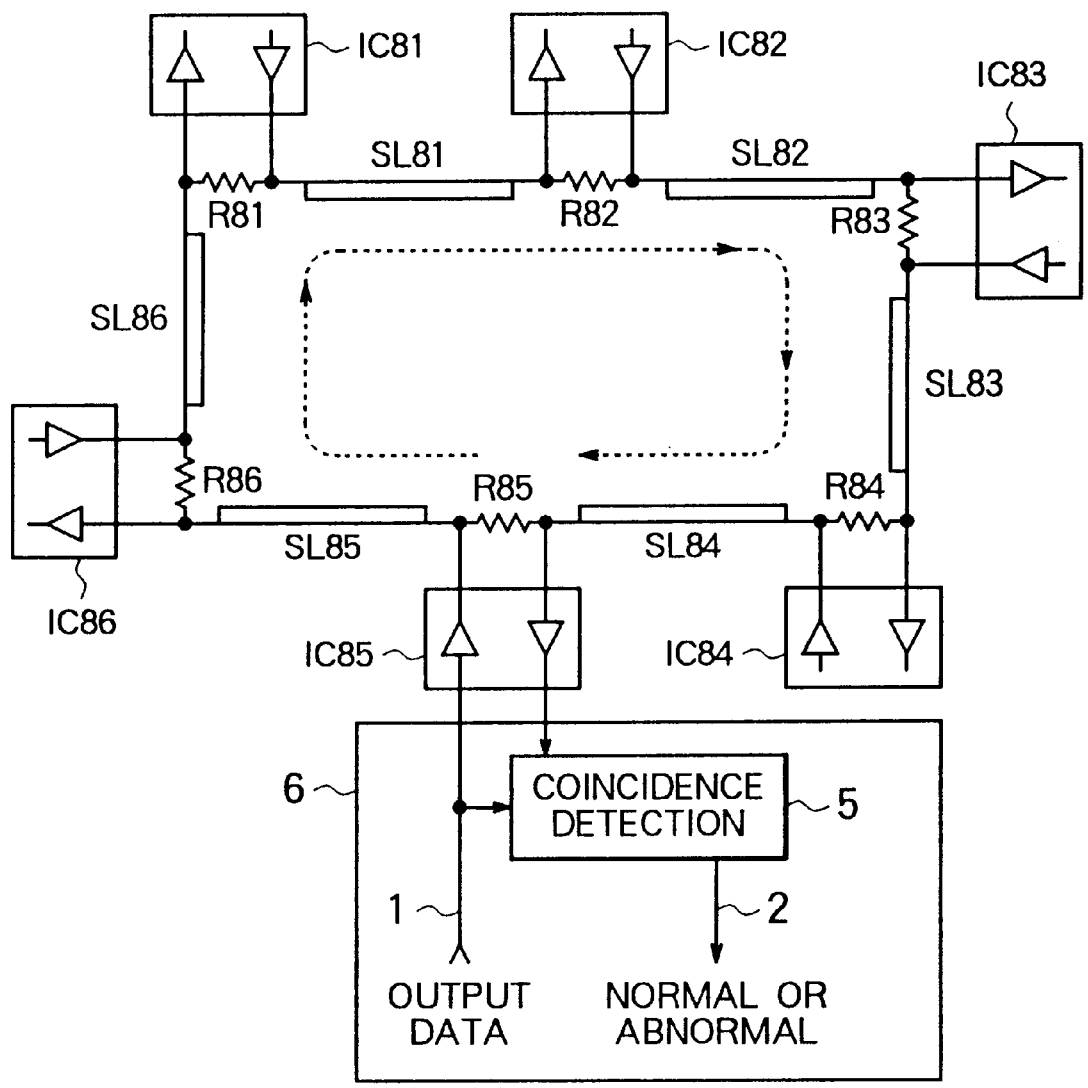
FIG. 10 is a diagram showing a basic circuit of a seventh embodiment of a high speed circuit system according to the present invention.

FIG. 10 shows a basic circuit diagram of the present embodiment. In FIG. 10, IC81 through IC86 denote ICs each incorporating a driver and a receiver. SL81 through SL86 denote transmission lines mounted on print circuit boards to transfer signals on a bus. R81 through R86 denote resistors. Reference numeral 5 denotes a coincidence detection circuit. Reference numeral 6 denotes an abnormality detector. The configuration of the present embodiment is the same as that of the sixth embodiment except the abnormality detector 6.

Operation will now be described. As for the signal transfer of the present embodiment, it is the same as that of the sixth embodiment and consequently its description will be omitted.

In the present embodiment, output of the IC85 incorporating a driver and a receiver separated from the driver is connected to the abnormality detector 6, and thereby it is checked at the IC85 whether the high speed bus is normal or abnormal.

A signal line 1 is a data line for outputting data from the driver of the IC85 to the high speed bus. It is checked by the coincidence detection circuit 5 whether data received by the receiver of the IC85 connected to the high speed bus coincides with data on the signal line 1.

As described heretofore with respect to the embodiments, a plurality of ICs are connected to transmission lines via resistors and the entire bus circuit is formed so as to form one loop. This results in an effect that high speed signal transfer causing less reflection distortion can be conducted without dissipating useless DC power.

As shown in, the first embodiment, for example, an IC is directly connected to each of ends of a bus component formed by a resistor and a transmission line. Therefore, the above described effect is enhanced, and further higher speed signal transfer can be conducted.

As shown in the second embodiment, for example, two or more ICs are connected to each of ends of a bus component formed by a resistor and a transmission line when interconnecting a plurality of ICs. Therefore, the above described effect is obtained, and the number of the resistors connected to the high speed bus can be reduced.

As shown in the third embodiment, for example, an IC is directly connected to each end of each resistor forming the bus circuit. Therefore, the above described effect is obtained, and the number of the resistors connected to the high speed bus can be reduced.

As shown in the fourth embodiment, for example, a plurality of drivers and receivers are connected to each end of each resistor. Therefore, the above described effect is obtained, and the number of the resistors connected to the high speed bus can be further reduced as compared with the second and third embodiments.

As shown in the fifth embodiment, for example, two systems each having a loop-formed bus circuit including resistors in the same way as the first embodiment are prepared, and the signal plus (+) side and the signal (−) side of each IC are directly connected to one sides of respective resistors. Therefore, the effect of the first embodiment is obtained, and an effect that an influence of disturbance factors can be suppressed is obtained.

As shown in the sixth embodiment, for example, a driver disconnected from a receiver is connected to one end of each resistor and the receiver is connected to the other end of the receiver. Therefore, the effect of the first embodiment is obtained, and an effect that the state of the bus circuit can be monitored is obtained.

As shown in the seventh embodiment, for example, data outputted to a driver incorporated in an IC is compared with data inputted from a receiver. Therefore, the effect of the first embodiment is obtained, and an effect that the reliability of the bus circuit can be enhanced is obtained.

What is claimed is:

1. A high speed bus circuit system comprising:
    a bus including alternately connected resistors and transmission lines, each of said resistors having a predetermined resistance value, said transmission lines being mounted on print circuit boards, said bus being connected in a loop form as a whole; and
    integrated circuits each having a driver and a receiver, said driver and said receiver being connected to respective one of said resistors.

2. The high speed bus circuit system according to claim 1, wherein respective one of said integrated circuits is connected to only one end of each of said resistors so that corresponding one of said resistors may act as a terminal resistor and a sending-end resistor when one of said drivers drives said bus.

3. The high speed bus circuit system according to claim 2, wherein respective one of said integrated circuits is connected to only one end of each of said resistors.

4. The high speed bus circuit system according to claim 2, wherein a plurality of ones out of said integrated circuits are connected to only one end of each of said resistors.

5. The high speed bus circuit system according to claim 1, wherein respective ones of said integrated circuits are connected to each end of each of said resistors so that corresponding one of said resistors may act as a terminal resistor and a sending-end resistor when one of said drivers drives said bus.

6. The high speed bus circuit system according to claim 5, wherein respective one of said integrated circuits is connected to each end of each of said resistors.

7. The high speed bus circuit system according to claim 5, wherein a plurality of ones out of said integrated circuits are connected to each end of each of said resistors.

8. A high speed bus circuit system comprising:
    a first bus and a second bus each including alternately connected resistors and transmission lines, each of said resistors having a predetermined resistance value, said transmission lines being mounted on print circuit boards, each of said first bus and said second bus being connected in a loop form as a whole; and
    integrated circuits each having a differential driver and a differential receiver, a plus side of said driver and said receiver being connected to respective one resistor of said first bus, a minus side of said driver and said receiver being connected to respective one resistor of said second bus.

9. A high speed bus circuit system comprising:
    a bus including alternately connected resistors and transmission lines, each of said resistors having a predetermined resistance value, said transmission lines being mounted on print circuit boards, said bus being connected in a loop form as a whole; and
    integrated circuits each having a driver and a receiver disconnected from each other, said driver and said receiver being respectively connected to one end and the other end of respective one of said resistors.

10. The high speed bus circuit system according to claim 9, further comprising an abnormality detector for outputting data to a driver of a specific integrated circuit, receiving data from a receiver of said specific integrated circuit, comparing the outputted data with the received data, and thereby detecting an abnormality of said bus.

* * * * *